United States Patent
Fritz et al.

(10) Patent No.: US 6,246,945 B1
(45) Date of Patent: Jun. 12, 2001

(54) PROCESS AND SYSTEM FOR CONTROLLING THE LONGITUDINAL DYNAMICS OF A MOTOR VEHICLE

(75) Inventors: Hans Fritz, Ebersbach/Fils; Ottmar Gehring, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/415,055

(22) Filed: Oct. 12, 1999

Related U.S. Application Data

(63) Continuation-in-part of application No. 08/908,038, filed on Aug. 11, 1997, now Pat. No. 6,098,007.

(30) Foreign Application Priority Data

Aug. 10, 1996 (DE) .............................................. 196 32 337
Oct. 10, 1998 (DE) .............................................. 198 46 820

(51) Int. Cl.[7] .......................... G05B 17/02; G05B 13/04; B60K 31/00
(52) U.S. Cl. .............................. 701/70; 701/71; 702/148; 303/140; 303/112
(58) Field of Search ................................ 701/70, 71, 79; 702/148; 180/141; 303/140, 112, 157

(56) References Cited

U.S. PATENT DOCUMENTS

| | | | |
|---|---|---|---|
| 5,172,785 | * | 12/1992 | Takahashi ............................ 180/141 |
| 5,208,754 | * | 5/1993 | Nakaura et al. ................. 364/426.01 |
| 5,446,658 | * | 8/1995 | Pastor et al. ..................... 364/424.01 |
| 5,657,229 | * | 8/1997 | Naito et al. ..................... 364/426.015 |
| 5,740,042 | * | 4/1998 | Fujioka .......................... 364/426.015 |
| 5,790,970 | * | 8/1998 | Bracher et al. ........................ 701/70 |
| 5,808,890 | * | 9/1998 | Sasaki ............................. 364/424.046 |
| 5,960,377 | * | 9/1999 | Hyde .................................... 702/148 |
| 6,015,192 | * | 1/2000 | Fukumura ............................ 303/140 |

FOREIGN PATENT DOCUMENTS

| | | | |
|---|---|---|---|
| 2316191 | * | 2/1998 | (GB) . |
| 1-501927 | | 7/1989 | (JP) . |
| 6-324138 | | 11/1994 | (JP) . |
| 7-251651 | | 10/1995 | (JP) . |
| WO 87/05867 | | 10/1987 | (WO) . |

* cited by examiner

Primary Examiner—William A. Cuchlinski, Jr.
Assistant Examiner—Tuan C To
(74) Attorney, Agent, or Firm—Evenson, McKeown, Edwards & Lenahan, P.L.L.C.

(57) ABSTRACT

In a process and a system for controlling the longitudinal dynamics of a motor vehicle, a drive train actuating signal is determined from actual vehicle condition data, controller-internal desired longitudinal velocity values, and desired longitudinal acceleration values determined by means of fed input data concerning the desired longitudinal acceleration and the actual driving condition. According to the invention, as a function of the controller-internal desired longitudinal velocity values and desired longitudinal acceleration values as well as of actual driving condition data, by means of an inverse characteristic vehicle longitudinal dynamics diagram, a desired drive train actuating signal is determined and the drive train actuating signal is determined therefrom.

8 Claims, 3 Drawing Sheets

PROCESS AND SYSTEM FOR CONTROLLING THE LONGITUDINAL DYNAMICS OF A MOTOR VEHICLE

This application is a continuation-in-part of U.S. patent application Ser. No. 08/908,038, filed Aug. 11, 1997 now U.S. Pat. No. 6,098,007.

This application claims the priority of German patent documents 198 46 820.2, filed Oct. 10, 1998, and 196 32 337.1, filed Aug. 10, 1996 the disclosure of which is expressly incorporated by reference herein.

BACKGROUND AND SUMMARY OF THE INVENTION

The invention relates to a process and a system for controlling the longitudinal dynamics of a motor vehicle.

A process and a system of this generic type are disclosed in German patent document DE 196 32 337 A1. In that System, the longitudinal dynamics are controlled by a drive train actuating signal, and optionally also by a brake system actuating signal. The two actuating signals are generated by a two-stage longitudinal dynamics controller which includes a first stage for determining controller-internal values for the desired longitudinal velocity and the desired longitudinal acceleration. A second stage connected behind the first stage uses the fed controller-internal desired longitudinal velocity values and desired longitudinal acceleration values as well as fed input data concerning the actual driving condition to compute the drive train actuating signal (and optionally the brake system actuating signal) by means of an inverse vehicle longitudinal dynamics model. The vehicle longitudinal dynamics model contains an engine model which determines from an input drive train actuating signal the engine torque supplied by the engine and the rotational engine speed as input quantities for an automatic transmission and rear axle model unit connected downstream. The latter determines therefrom a wheel driving torque applied to the driving wheels and the pertaining rotational wheel speed. In parallel thereto, a brake system model unit determines a pertaining braking torque from the supplied brake system actuating signal. The automatic transmission and rear axle model unit contains a model of a torque converter and of a multi-step reduction gear, the torque converter being assumed to be a hydrodynamic clutch, in which the torques are transmitted by a fluid between the pump wheel and the turbine wheel.

In contrast to other conventional systems, such as that described in German patent document DE 43 38 399 A1, this system has the advantage that it better takes into account the nonlinear behavior of the vehicle. This is of considerable significance particularly at low driving speeds and in the case of greater longitudinal road slopes or at different vehicle loads. It is particularly beneficial in the case of trucks, and also in range control systems, such as range cruise control systems for medium and high driving speeds as well as stop-and-go vehicle follow systems for low driving speeds, in which a longitudinal dynamics control circuit is subordinate to a range controller. From the measured range and the relative speed, the superimposed range controller determines a desired acceleration for the subordinate longitudinal acceleration control circuit. The range control becomes more precise when the subordinate control circuit compensates for non-linear vehicle handling characteristics because the design of the range controller can then be based on a linear vehicle behavior. Although the system according to German patent document DE 196 32 337 A1 takes these demands into account, this requires either that a sufficiently precise inverse vehicle longitudinal dynamics model exists, or that one can be set up. This is not ensured in all cases. In addition, this known approach requires a relatively large amount of computing power for continuous computations within the inverse vehicle longitudinal dynamics model.

One object of the invention is to provide a longitudinal dynamics control process and a system of the initially mentioned type which takes into account the non-linear vehicle longitudinal dynamics behavior with a satisfactory precision.

Another object of the invention is to provide such a process and system which require comparatively low computing expenditures for this purpose.

These and other objects and advantages are achieved by the process and apparatus according to the invention, in which the drive train actuating signal and optionally the brake system actuating signal are determined from actual driving condition data as well as from the controller-internal desired longitudinal acceleration values and desired longitudinal velocity values, by means of an inverse characteristic vehicle longitudinal dynamics diagram. Such a diagram can, for example, be determined beforehand by means of corresponding test drives from measured data recorded during these drives. In continuous driving, the use of such an inverse characteristic vehicle dynamics diagram requires significantly lower computing expenditures than the use of an inverse vehicle longitudinal dynamics model. In addition, this approach requires no knowledge concerning the behavior or the current condition of a transmission torque converter and of the engine. On the contrary, a desired drive train actuating signal is determined from the input data, such as those concerning the actual driving condition, controller-internal longitudinal velocity values. The drive train actuating signal can then be derived from the desired drive train actuating signal.

In one embodiment of the invention, the actual driving condition data taken into account contain data concerning the transmission ratio, the vehicle mass and/or the road slope. As a result, corresponding influences of the currently engaged transmission shifting position, and current vehicle loading and road slope can adequately be taken into account for the determination of the drive train actuating signal.

Another embodiment of the invention limits the controller-internal desired longitudinal velocity value (determined from the desired longitudinal acceleration and the actual longitudinal velocity) to a definable tolerance band around the actual longitudinal velocity. This feature avoids undesirably high jolt-type accelerations at larger speed deviations.

In still another embodiment of the invention, a brake system actuating signal is determined in addition to the drive train actuating signal. Both actuating signals are advantageously derived from the desired drive train actuating signal of the inverse characteristics vehicle longitudinal dynamics diagram such that the drive train or the brake system is appropriately activated in any situation.

Other objects, advantages and novel features of the present invention will become apparent from the following detailed description of the invention when considered in conjunction with the accompanying drawings.

DETAILED DESCRIPTION OF THE DRAWINGS

Figure 1:
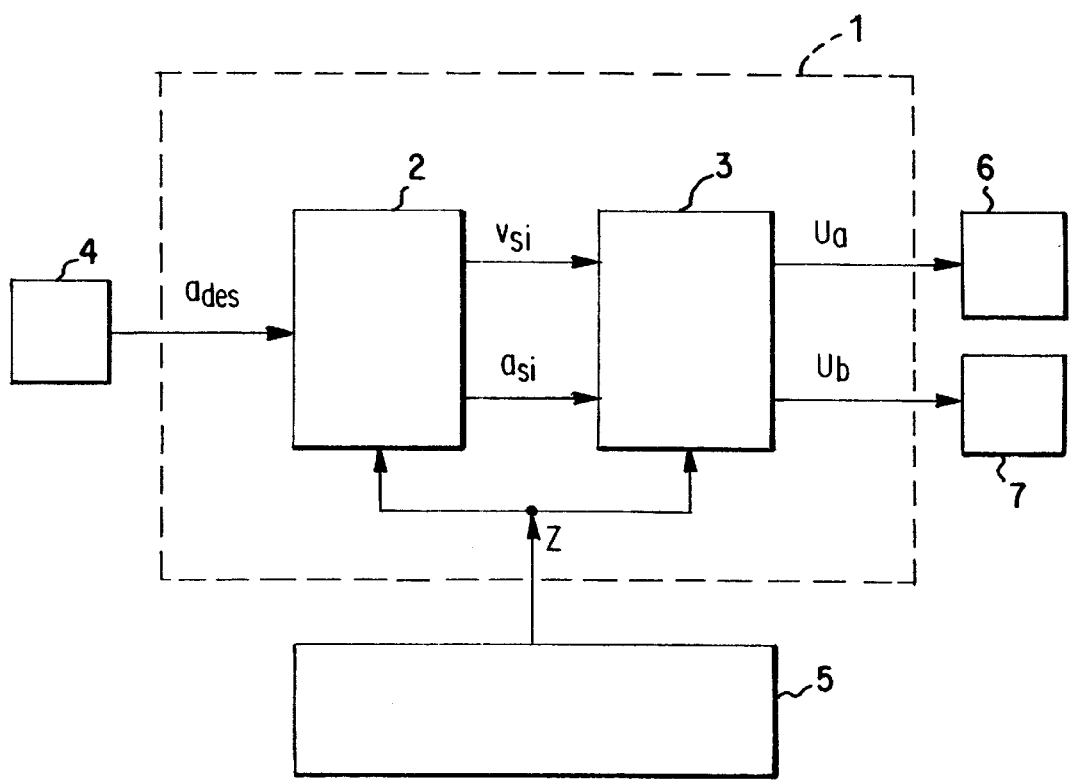
FIG. 1 is a schematic block diagram of a system for controlling the longitudinal dynamics of a motor vehicle having a two-stage controller containing an inverse characteristic vehicle longitudinal dynamics diagram.

The system illustrated in FIG. 1 for controlling the longitudinal dynamics of a motor vehicle, specifically driving acceleration control, contains a control unit 1 (framed by a broken line), which has two stages. In a first superimposed stage 2, a suitable control algorithm is implemented, while, in the following subordinate second stage 3, an inverse characteristic vehicle longitudinal dynamics diagram is implemented. A desired-value input unit 4 connected upstream of the controller 1 transmits to the control system 1 a time-variable desired longitudinal acceleration value $a_{des}$ defined by the driver or by a superimposed range control circuit.

From a corresponding sensor system 5, both controller stages 2, 3 receive information Z concerning current vehicle operating conditions. This information includes at least one of the quantities actual driving velocity $v_{actual}$, rotational engine speed $n_m$ and transmission ratio $i_g$ of a manual or automatic transmission existing in the vehicle as well as preferably the quantities actual longitudinal acceleration $a_{actual}$, actual road slope $\alpha_s$ and vehicle mass m.

The first controller stage 2 containing the control algorithm supplies from the fed input quantities a controller-internal desired driving velocity $v_{si}$ and an controller-internal desired longitudinal acceleration $a_{si}$. These two controller-internal desired values are supplied to the controller stage 3 which contains the inverse characteristic vehicle longitudinal dynamics diagram. Taking into account the driving condition information Z supplied to it by the sensor system 5, the second controller stage 3 determines on the one hand, a drive train actuating signal $U_a$, which is supplied to a drive train actuator 6, and, on the other hand, a brake system actuating signal $U_b$, which is supplied to a brake system actuator 7.

The first controller stage 2 of the longitudinal acceleration controller 1 may implement a control algorithm, in which the controller-internal desired longitudinal acceleration $a_{si}$ corresponds to the externally defined desired longitudinal acceleration $a_{des}$; that is, $a_{si}=a_{des}$. The controller-internal desired driving velocity $v_{si}$ is obtained as the sum of the actual longitudinal velocity $v_{actual}$ and the product from the externally supplied desired longitudinal acceleration $a_{des}$ with a corresponding definable controller parameter $T_a$; that is, $v_{si}=v_{act}+T_a \cdot a_{des}$.

A particularly advantageous embodiment provides a control algorithm in which the longitudinal acceleration control difference $a_{diff}$ (the difference between the desired longitudinal acceleration $a_{des}$ and the actual longitudinal acceleration $a_{actual}$) is formed first. Thereafter, a control-internal desired longitudinal acceleration $a_{si}$ is formed from the sum of the externally defined desired longitudinal acceleration $a_{des}$ and the proportional, integral and differential (PID) fraction of the longitudinal acceleration control difference $a_{diff}$. Independently thereof, the controller-internal desired driving velocity $v_{si}$ can also be formed by the integration of the externally definable desired longitudinal acceleration $a_{des}$ or by the integration of the control-internal desired longitudinal acceleration $a_{si}$; that is, the following relationships apply:

$$a_{si}=a_{des}+K_p \cdot a_{diff}+K_{ia} \cdot \Sigma(a_{diff})+K_d \cdot d(a_{diff})/dt,$$

$$v_{si}=K_{ia} \cdot \Sigma(a_{des}) \text{ or } v_{si}=K_{ia} \cdot \Sigma(a_{si}),$$

wherein $K_p$, $K_{ia}$, $K_d$ and $K_{ia}$ are controller parameters which are to be adjusted appropriately.

It is also advantageous to limit the controller-internal desired driving velocity $v_{si}$ as a function of the current actual longitudinal velocity $v_{actual}$. For this purpose, a tolerance band parameter dv can be defined, and the integrated controller-internal desired driving velocity $v_{si}$ can be held within the corresponding tolerance band dv about the value of the current actual longitudinal velocity $v_{actual}$. That is, the desired driving velocity $v_{si}$ is set to the maximal value $v_{actual}+dv$ if otherwise it would be above it, and is set to the minimal value $v_{actual}-dv$ if otherwise it would be below it. This avoids the setting of undesirably high accelerations by the control.

Figure 2:
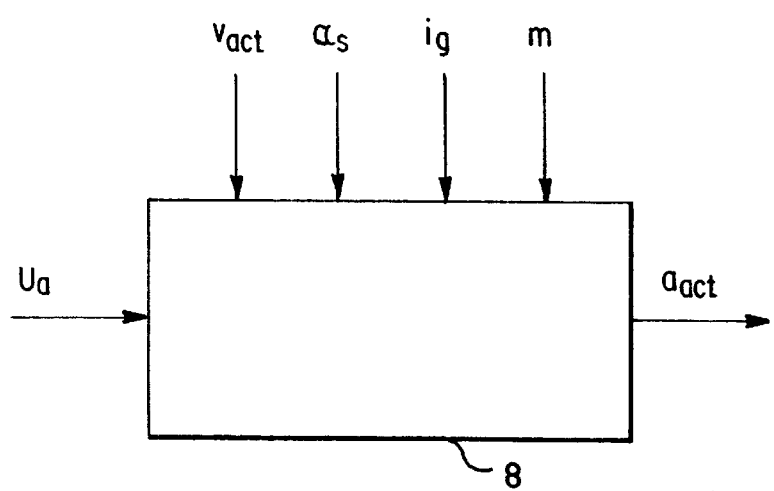
FIG. 2 is a schematic block diagram of the characteristic vehicle longitudinal dynamics diagram on which the controller of FIG. 1 is based.

The inverse characteristic vehicle longitudinal dynamics diagram $F^{-1}$ implemented in the second controller stage 3 within a corresponding characteristic diagram unit is based on a multidimensional characteristic vehicle longitudinal dynamics diagram F of a corresponding characteristic diagram unit 8. The latter is block-diagrammatically illustrated in FIG. 2 by means of its essential input and output quantities. As illustrated in FIG. 2 the characteristic diagram unit 8 receives as inputs the drive train actuating signal $U_a$ as well as values for driving velocity $v_{actual}$, transmission ratio $i_g$, actual road slope $\alpha_s$ and vehicle mass m (which describe the current driving condition working point). Therefrom, a non-inverted characteristic vehicle longitudinal dynamics diagram F supplies the actual longitudinal acceleration $a_{actual}$ pertaining to this working point as the output quantity; that is, $a_{actual}=F(U_a, v_{actual}, \alpha_s, i_g, m)$. The drive train actuating signal $U_a$ can be obtained therefrom by inverting; that is, from the inverse characteristic longitudinal dynamics diagram $F^{-1}$ in the form of $U_a=F^{-1}(a_{actual}, v_{actual}, \alpha_s, i_g, m)$.

Figure 3:
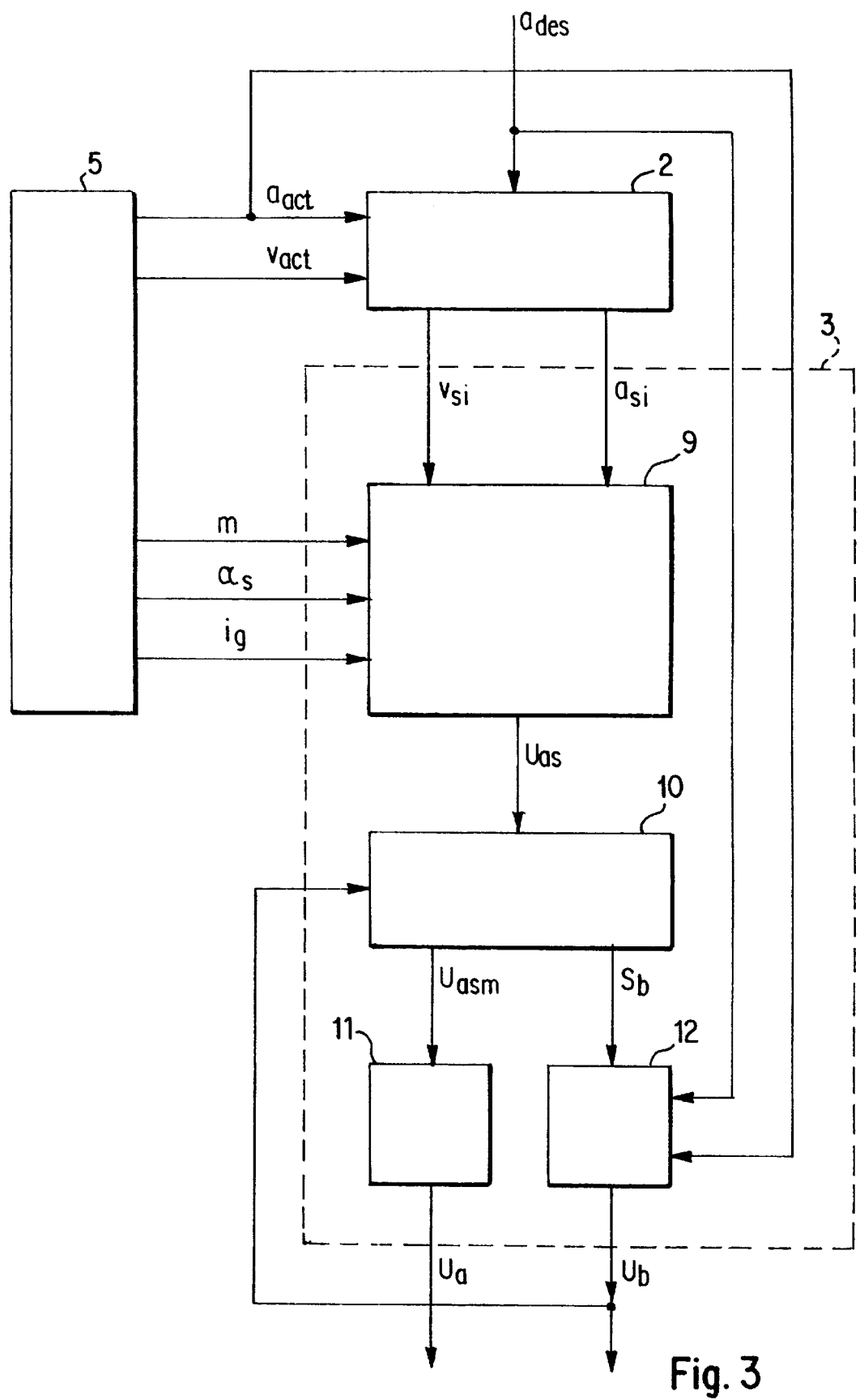
FIG. 3 is a schematic block diagram of the second of the two successively connected stages of the controller of FIG. 1.

In FIG. 3, the second controller stage 3 is illustrated in detail. As shown in this figure, the second controller stage 3 contains on the input side a characteristic diagram unit 9 for determining a desired drive train actuating signal $U_{as}$, and a unit 10 connected downstream, for the coasting/drive operation determination, which generates a modified desired drive train actuating signal $U_{asm}$ and a binary brake system control signal $S_b$. A drive train control unit 11 and a brake system control unit 12 are connected on the output side in parallel to one another. The drive train control unit 11 determines the drive train actuating signal $U_a$ as a function of the supplied modified desired drive train actuating signal $U_{asm}$, while the brake system control unit 12 generates the brake system actuating signal $U_b$ as a function of the binary brake system control signal $S_b$ as well as of the actual longitudinal acceleration $a_{actual}$ and of the externally defined desired longitudinal acceleration $a_{des}$.

The input-side characteristic diagram unit 9 of the second controller stage 3 determines the desired drive train actuating signal $U_{as}$ pertaining to the controller-internal desired driving velocity $v_{si}$ and to the controller-internal desired longitudinal acceleration $a_{si}$ by analyzing the inverse characteristic vehicle longitudinal dynamics diagram $F^{-1}$ implemented in it, as a function of the input signals concerning the transmission ratio $i_g$, the actual road slope $\alpha_s$ and the vehicle mass m supplied to the characteristic diagram unit 9 directly by the sensor system 5 or by way of the first controller stage 2 connected on the input side.

The following approach can be used to generate a suitable characteristic diagram. First, by means of the corresponding sensor system 5, the information Z, which describes the vehicle operating condition (that is, at least two of the quantities actual driving velocity $v_{actual}$, rotational engine speed $n_m$, transmission ratio $i_g$, actual longitudinal acceleration $a_{actual}$, actual road slope $\alpha_s$ and vehicle mass m, as well as the drive train actuating signal $U_a$) is detected by measuring in different measuring runs and this information is stored in measuring data files. A corresponding data set will then be present at any measuring point in time which can be used as a support point for the generating of the characteristic diagram.

For generating the characteristic diagram $a_{actual}=F(U_a, v_{actual}, \alpha_s, i_g, m)$ or the inverse characteristic diagram $U_a=F^{-1}(a_{actual}, v_{actual}, \alpha_s, i_g, m)$, it is particularly advantageous to use a known approach, such as that indicated in the Magazine Article "Methods of Non-Linear Modelling—from the Interpolation Polynomial to the Neuronal Network", *Automatisierungstechnik* 42, 1994. Alternatively, conventional neuronal training methods or fuzzy methods can be used for generating a suitable characteristic diagram. The characteristic diagram will then be present as a neuronal network or as a fuzzy characteristic diagram. The multi-dimensional characteristic diagram may also be assembled from several other characteristic diagrams of an order reduced by one. This is advantageous particularly in the case of signals which can take up only a few discrete conditions. For example, for each value of the transmission ratio $i_g$, a separate partial characteristic diagram of the whole characteristic diagram can be constructed.

Figure 4:
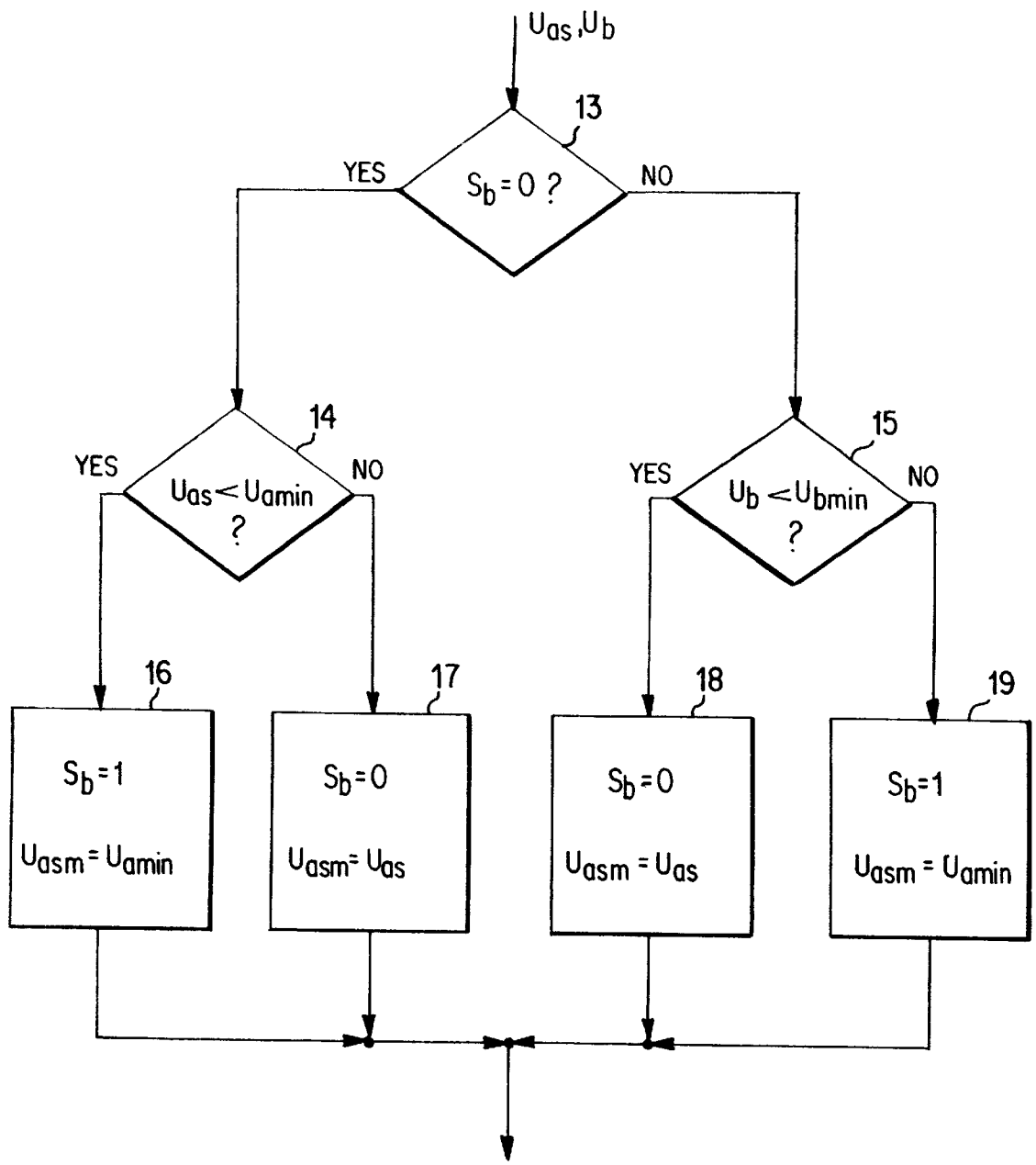
FIG. 4 is a flow chart for illustrating a drive-coasting switch-over implemented in the second stage of the longitudinal dynamics controller of FIG. 1.

The desired drive train actuating signal $U_{as}$ determined by means of the inverse characteristic vehicle longitudinal dynamics diagram $F^{-1}$ is then fed to the unit 10 connected to the output side which prevents a giving of gas and a braking from taking place simultaneously as the result of the control. For this purpose, the unit 10 carries out the process illustrated in detail in FIG. 4. In a first step 13, by means of the value of the binary control signal $S_b$, it is determined whether no braking operation is active; that is, whether this binary control signal $S_b$ has the zero value. If this is so, in a subsequent step 14 a determination is made whether the desired drive train actuating signal $U_{as}$ determined by the characteristic diagram unit 9 is smaller than a minimal actuating signal $U_{amin}$ which can be effectively implemented by the drive train control unit 11. If so, (which means that the effective coasting torque of the engine is not sufficient for the desired vehicle deceleration), in a next step 16, the binary brake system control signal $S_b$ is set to the value one, and the brake system control unit 12 is thus informed that a braking operation is to be activated. Simultaneously, the modified desired drive train actuating signal $U_{asm}$ receives the minimal effectively implementable value $U_{amin}$ of the drive train actuating signal.

If the actuating signal query step 14 receives a negative reply, braking continues to be unnecessary, so that the binary brake system control signal $S_b$ remains on the zero value and the desired drive train actuating signal $U_{as}$ is transmitted unchanged as the modified desired drive train actuating signal $U_{asm}$ (step 17). In this case, engine braking power is sufficient for a possible braking.

If the control signal step 13 generates a negative answer (a braking operation is active, that is, the brake system is activated), it is examined in a subsequent step 15 whether the brake system actuating signal $U_b$ determined by the brake system control unit 12 is smaller than a minimal actuating signal $U_{bmin}$ which it can effectively implement. As illustrated in FIG. 3, for this purpose, the brake system actuating signal $U_b$ is returned to the unit 10. If this is so (which means that a braking effect is no longer required of the brake system), in a subsequent step 18, the brake system control signal $S_b$ is set to the zero value and the brake system control unit 12 is therefore informed that the braking operation is to be terminated. Simultaneously, the desired drive train actuating signal $U_{as}$ is transmitted unchanged as the modified desired drive train actuating signal $U_{asm}$. In this case, the engine braking effect is again sufficient for a possible braking effect.

If the brake system actuating signal query step 15 receives a negative reply (the desired braking effect determined by the brake system control unit 12 is larger than the braking effect which can be minimally implemented by the brake system), the binary brake system control signal $S_b$ remains on the value one. That is, the brake system continues to remain active, and the modified desired drive train actuating signal $U_{asm}$ is set to the value of the minimal drive train actuating signal $U_{amin}$; thus, the engine brake is used with a maximal effect.

As indicated in the above explanation, the algorithm implemented in the unit 10 for the drive/coasting operation determination ensures that the control will not simultaneously give gas and brake; it also ensures that engine braking is always utilized to the fullest extent possible to brake the vehicle, and that the brake system will be activated only when the engine braking effect is no longer sufficient.

On the whole, the above description of an embodiment according to the invention and possible modifications thereof demonstrate that, by means of the invention, a process and a system for the vehicle longitudinal dynamics control can be provided which take into account the non-linear dynamic behavior of the motor vehicle, which is relevant particularly in the low driving velocity range, already within the longitudinal dynamics control and therefore offer favorable control characteristics specifically also in the low driving velocity range and which require relatively low computing expenditures for this purpose in that they use an inverse characteristic vehicle longitudinal dynamics diagram constructed beforehand.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for controlling the longitudinal dynamics of a motor vehicle, comprising:

determining controller-internal desired longitudinal velocity values and desired longitudinal acceleration values based on fed input data concerning desired longitudinal acceleration and concerning actual driving conditions, and determining a drive train actuating signal based on actual driving condition data as well as on the controller-internal desired longitudinal velocity values and desired longitudinal acceleration values; wherein a desired drive train actuating signal is determined as a function of the controller-internal desired longitudinal velocity values and the desired longitudinal acceleration values, and as a function of actual driving condition data, using an inverse characteristic vehicle longitudinal dynamics diagram; and a drive train actuating signal is determined based on the desired drive train actuating signal.

2. Process according to claim 1, wherein the actual driving condition data used for the characteristic-diagram-based determination of the desired drive train actuating signal comprise data concerning at least one of a transmission ratio, vehicle mass and road slope.

3. Process according to claim 1 wherein the controller-internal desired longitudinal acceleration is determined as a function of desired longitudinal acceleration and actual longitudinal velocity, and is limited to a definable tolerance about actual longitudinal velocity.

4. Process according to claim 1, further comprising:

in addition to a desired drive train actuating signal, determining a brake system actuating signal based on a desired drive train actuating signal and the momentary brake system actuating signal; and determining a binary brake system control signal corresponding to activating and deactivating the brake system, such that the brake system is activated only when a required vehicle deceleration cannot be achieved by engine braking alone.

5. A longitudinal dynamics control system for a motor vehicle, which generates a drive train actuating signal based on input data indicative of a desired longitudinal acceleration and of actual vehicle driving conditions, said longitudinal dynamics control system comprising:

a first stage for determining controller-internal values for a desired longitudinal acceleration and a desired longitudinal velocity; and a second stage connected downstream from the first stage, said second stage comprising an inverse characteristic vehicle longitudinal dynamics diagram unit, which uses an inverse characteristic vehicle longitudinal dynamics diagram to determine a desired drive train actuating signal based on the controller-internal desired longitudinal velocity values, desired longitudinal acceleration values, and fed actual driving condition data; and first units connected on the output side of the second stage, which derive the drive train actuating signal from the desired drive train actuating signal.

6. System according to claim 5, further comprising a second unit for drive/coasting operation determination, connected behind the inverse characteristic vehicle longitudinal dynamics diagram unit, which second unit uses the desired drive train actuating signal and a returned brake system actuating signal to generate a modified desired drive train actuating signal and a binary brake system control signal based on a comparison of the desired drive train actuating signal and a minimal drive train actuating signal, a comparison between the brake system actuating signal and a minimal brake system actuating signal, and a previous value of the binary brake system control signal.

7. The process according to claim 6, wherein said characteristic inverse vehicle longitudinal dynamics diagram is prepared by:

first, performing a plurality of measurement runs with said vehicle;

second, recording at least drive train actuating signals for each measurement run as well as a plurality of vehicle longitudinal dynamic response parameters during each measurement run;

third, using said recorded drive train actuating signals and vehicle longitudinal dynamic response parameters as support points for generating a multidimensional vehicle longitudinal dynamic diagram, which determines a response of said vehicle to an input drive train actuating signal; and inverting said vehicle longitudinal dynamic diagram whereby an input of vehicle response parameters determines and output drive train actuating signal.

8. The process according to claim 7 wherein said third step comprises using one of neuronal training methods and fuzzy logic techniques to generate said vehicle longitudinal dynamic diagram.

* * * * *